United States Patent [19]

Vercillo

[11] 4,311,549
[45] Jan. 19, 1982

[54] LAMINATOR WITH HEATING CONTROL SYSTEM

[75] Inventor: Alfredo J. Vercillo, Harwood Heights, Ill.

[73] Assignee: General Binding Corporation, Northbrook, Ill.

[21] Appl. No.: 177,229

[22] Filed: Aug. 11, 1980

[51] Int. Cl.³ .................... B30B 3/04; B30B 15/34; B32B 31/20

[52] U.S. Cl. .................... 156/308.2; 100/38; 100/93 P; 100/93 RP; 100/137; 156/359; 156/368; 156/366; 156/583.1

[58] Field of Search ............ 156/555, 359, 368, 583.1, 156/366, 308.2; 100/38, 51, 93 P, 93 RP, 137, 172, 176, 218

[56] References Cited

U.S. PATENT DOCUMENTS

| | | | |
|---|---|---|---|
| 3,047,051 | 7/1962 | Matveeff | 156/359 |
| 3,139,816 | 7/1964 | Jemison et al. | 100/93 P |
| 3,598,684 | 8/1971 | Militana et al. | 100/51 |
| 3,770,550 | 11/1973 | Levitan | 156/555 |
| 3,943,031 | 3/1976 | Krueger et al. | 156/583.1 |
| 4,097,326 | 6/1978 | Giulie et al. | 156/366 |
| 4,102,730 | 7/1978 | Staats | 156/555 |
| 4,172,750 | 10/1979 | Giulie | 156/366 |

*Primary Examiner*—Michael G. Wityshyn
*Attorney, Agent, or Firm*—Hill, Van Santen, Steadman, Chiara & Simpson

[57] ABSTRACT

An improved laminator with a novel heating control system is disclosed for particular employment with laminating packets formed of an article to be laminated positioned between top and bottom leaves. When the packet is aligned in a ready position within the laminating machine, heating elements in a heating zone of the laminating machine are activated while the packet is stationary. When the heating zone attains a first temperature, movement of the packet is initiated in the heating zone. During passage through the heating zone, when the heating zone attains a second temperature, power to the heating elements is cycled so as to maintain the second temperature substantially constant. Also, to further minimize temperature overshoot, power to the heating elements is temporarily removed when the first temperature is attained. With the system of the invention, the dual problems of temperature overshoot and insufficient lamination of lead ends of the packet is avoided.

10 Claims, 6 Drawing Figures

LAMINATOR WITH HEATING CONTROL SYSTEM

BACKGROUND OF THE INVENTION

In reissue patent application Ser. No. 965,097, "POWER ACTUATED LAMINATING MACHINE", filed Nov. 30, 1978, incorporated herein by reference, a laminating system is disclosed for use with laminating packets. Each packet preferably comprises upper and lower laminating leaves such as polyethylene film with a heat reactivatible adhesive layer thereon and a cardboard tab attached at one end of the packet which is releasable such as by adhesive tape. After the packet is run through the laminating machine, the tab is then removed.

In this system, the lamination machine provided has upper and lower heating plates forming a heating zone and rearwardly of the heating zone upper and lower drive rollers are provided which form a nip for engaging the cardboard tab. Initially, an operator inserts the packet into the machine into a "ready" position. Thereafter, the operator may activate a handle on the machine which causes the heating plates to approach one another and also causes the drive rollers to engage the cardboard tab.

When the handle is engaged, the heaters come up to proper operating temperature and a thermistor is provided through a zero crossing switch which causes the heaters to turn off and on to maintain desired temperature. A drive motor is activated which causes the packet to begin moving through the machine. As the trailing edge of the packet passes a sensor, a time delay is actuated and the motor continues to operate for a sufficient length of time for the packet to completely clear the machine. The tab is then torn off the packet and the lamination operation is completed.

With this system, temperature overshoot problems occur since the heating zone temperature continues to rise despite disconnection of power after achieving an operating temperature. This temperature overshoot causes excessive heating of the packet and particularly the connection tape between the tab and the packet. Also, since the packet remains stationary while the temperature increases to operating temperature, the packet does not act as a "load" in the heating zone since typically only the lead end of the packet is present in the heating zone. Since this lead end is stationary in the heating zone, the amount of heat transfer is less than it is when the packet is moving and consequently excessive temperature rises occur.

SUMMARY OF THE INVENTION

It is an object of the invention to laminate an object positioned within a laminating packet such that the entire object is laminated in a uniform manner without initial portions of the packet experiencing low heat laminating conditions while other portions of the packet exhibit higher heat laminating conditions.

It is a further object of the invention to prevent temperature overshoot which results in excessive heating during laminating operation which can result in damage to the laminating film and/or adhesive tape connecting a tear off cardboard tab to the packet film leaves.

It is an additional object of the invention to provide temperature control during laminating so as to provide a superior product which has uniform laminating characteristics.

In accordance with the method and apparatus for laminating of the invention, the lead edge of the packet is initially placed in a ready position in the heating zone prior to applying electrical power to the heating member. Electrical power is then applied to the heating member without initiating movement of the packet through the heating zone. When the heating zone attains a first temperature, movement of the packet is initiated through the heating zone. While the packet is moving, power is controlled to the heating member to maintain the heating zone at a subsequent second temperature which is substantially higher than the first temperature and which is suitable for continuous laminating of product. Preferably to reduce temperature overshoot, when the first temperature is reached the power to the heating member is temporarily interrupted. Thereafter, as the packet is moving through the heating zone power is reapplied until the second temperature is reached at which point the power is cycled on and off so as to maintain the second temperature. When a trailing edge of the packet has approximately cleared the heating zone, power is disconnected to the heating member to permit cooling thereof.

With the invention, insufficient laminating at leading edges of the packet is prevented by allowing the heaters to warm up prior to movement of the laminating packet. Movement of the packet is initiated, however, before a desired operating temperature for continuous laminating is achieved so as to present a moving "load" and thus prevent temperature overshoot. Also, power to the heating elements is interrupted when the first temperature is reached to further prevent temperature overshoot. Finally, when the second temperature is achieved, the temperature is stabilized. The overall result is the elimination of excessive heating at the leading edge of the packet caused by temperature overshoots and the overall lamination quality is greatly improved by providing a uniform laminating characteristic over the entire packet yet without harming the packet itself or particularly connecting tape which retains the tear-off cardboard tab to the packet laminating leaves.

DESCRIPTION OF THE PREFERRED EMBODIMENTS

Figure 1A:
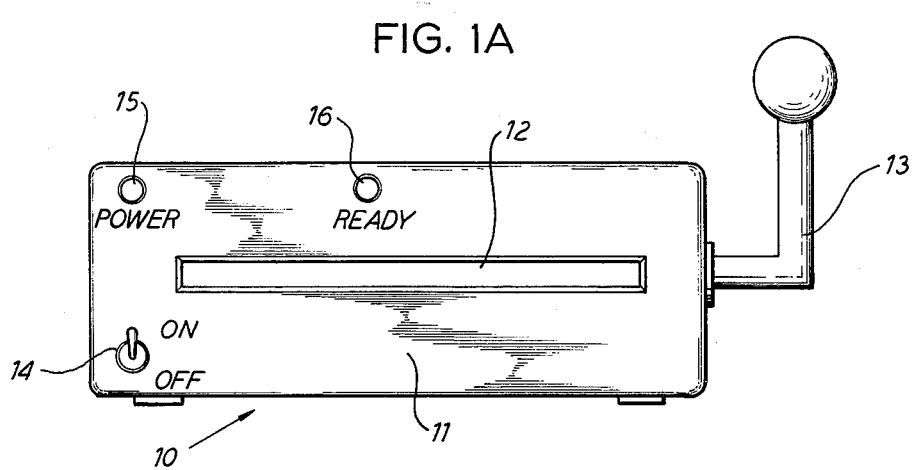
FIG. 1A is a front view of an improved laminating machine of the invention.
Figure 1B:
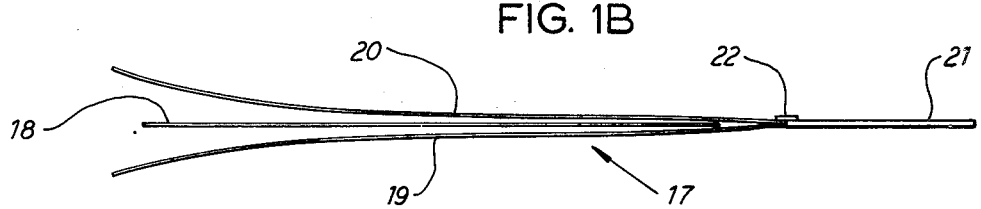
FIG. 1B is a side view of a laminating packet employed in the laminating machine of the invention.

As shown in FIG. 1A, a laminator machine 10 of the invention has a front panel 11 with an entrance aperture 12 therein into which a laminating package such as shown in FIG. 1B can be inserted. An operator start command lever 13 is provided which initiates lamination after insertion of the packet into a "ready" position. A main power on-off switch 14 is preferably provided on the front panel together with a main power light 15. A "ready" light 16 is similarly positioned on the front panel for indicating positioning of a compatible packet in the machine.

The laminating packet 17 as shown in FIG. 1B contains an article 18 to be laminated. Article 18 is positioned between lower and upper laminating leaves 19 and 20 such as of polyethylene and having a heat reactivatible adhesive layer thereon in well-known fashion. A cardboard tab 21 connects at a leading end of the packet to the leaves 19 and 20 by use of a strip of tape 22. In place of the above-described packet, with the laminating machine of the invention it is also possible to employ a cardboard carrier within which the laminating leaves and product are positioned in sandwich fashion.

Figure 2A:
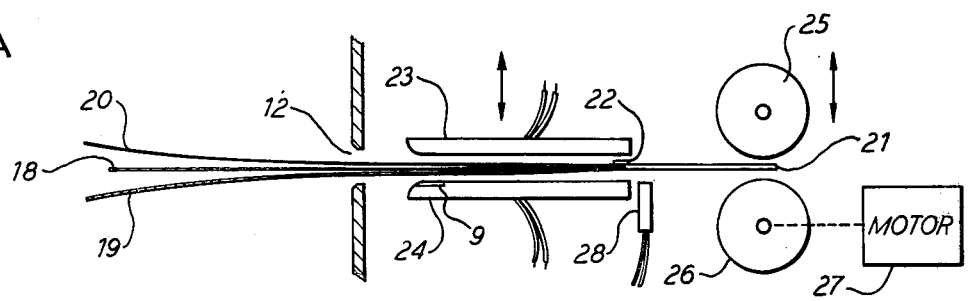
FIG. 2A is a side view of the heating zone and drive rollers of the laminating machine of FIG. 1A.
Figure 2B:
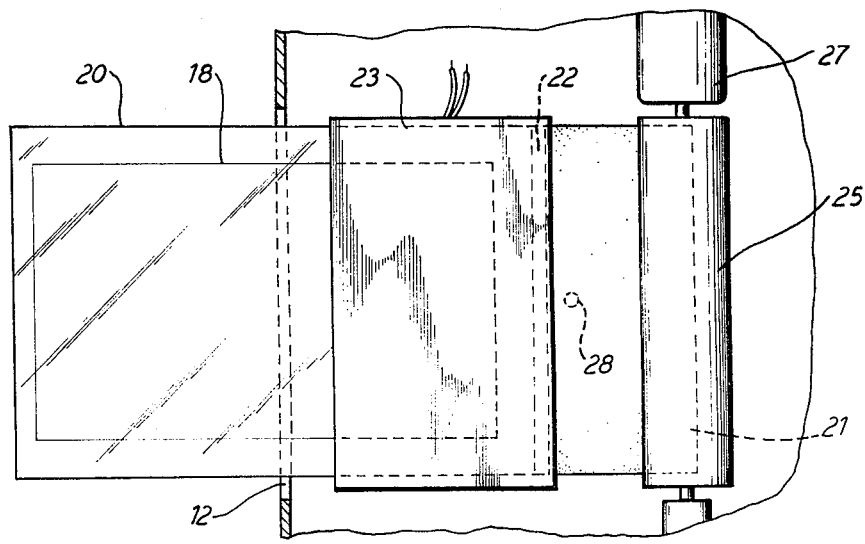
FIG. 2B is a top view of FIG. 2A.

As shown in FIG. 2A, the laminating machine contains an upper and lower heater plate 23 and 24 which form a heating zone through which the laminating packet passes. A thermistor 9 may be placed on the lower heater plate 24, for example, to measure a temperature at a surface thereof which approximates a temperature within the heating zone between the plates.

Upper and lower drive rollers 25 and 26 are provided rearwardly of the heating zone for engagement with a leading end of the packet and preferably the cardboard tab 21. Initially the heating plates may be spaced such as by providing the upper heating plate 23 movable, and as described in the aforementioned reissue application. Also, the upper drive roller 25 may be movable so that in a down position it forms a nip which engages the cardboard tab 21 as the operating lever 13 is pulled, again as described in the reissue application.

A drive motor 27 is linked to the drive rollers to permit selective drive thereof.

A photocell preferably of a reflection type is positioned at 28 so as to sense presense of the packet in the machine.

Operation of the laminating machine system will now be described by reference to FIG. 3. When the power switch is activated, the power light illuminates. Thereafter, a pouch is inserted in the machine into a "ready" position which is sensed by the photocell 28 and the "ready" light illuminates. Thereafter, the operator lowers the handle 13 which provides the operator start command. This operator start command results in heater power being applied to the heater elements until a first temperature is attained such as 230°-240° F. At this first temperature termed in the graph as a "set temperature-lower", power to the motor for the drive rollers is applied and the laminating packet begins moving through the machine. At the same time, power to the heaters is cut temporarily and then reapplied until a second higher temperature such as approximately 275° F. is attained. This temperature is chosen as the most desirable continuous laminating temperature after steady state conditions for laminating have been attained. Heater power is then cycled on and off so as to approximately maintain the second temperature termed in the graph as a "set temperature-upper". Finally, when the laminating packet clears the photocell, power to the heaters is disconnected, the ready light extinguishes, and a timer is activated which allows the drive motor to continue operating until the packet clears the machine for a given time interval. The temperature of the heating zone is shown at the bottom of the graph in FIG. 3.

With the invention, temperature overshoots resulting in excessive heating are avoided and also uneven laminating such as an initial cold laminating followed by initial excessive heating laminating is avoided. Also, the sensitive adhesive tape employed for connecting the cardboard tab to the packet is not damaged with the heating control system in accordance with this invention.

Figure 3:
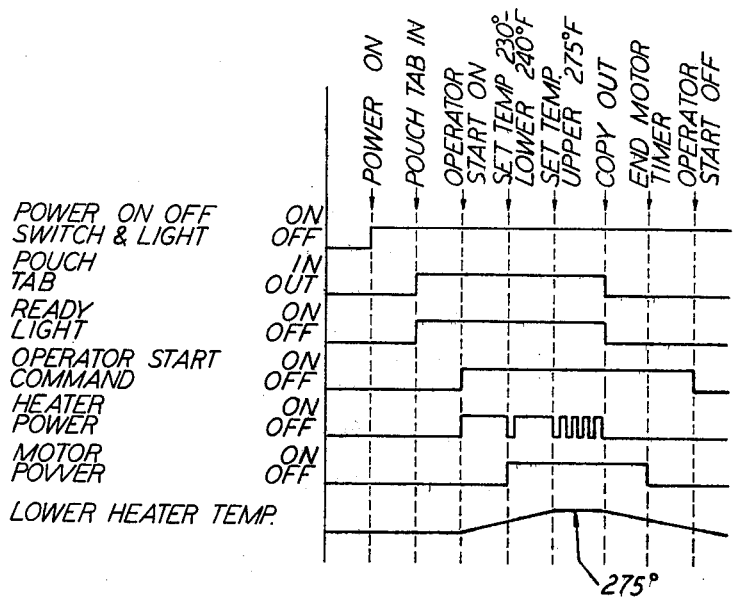
FIG. 3 is a graph illustrating operation of the laminating machine of the invention.
Figure 4:
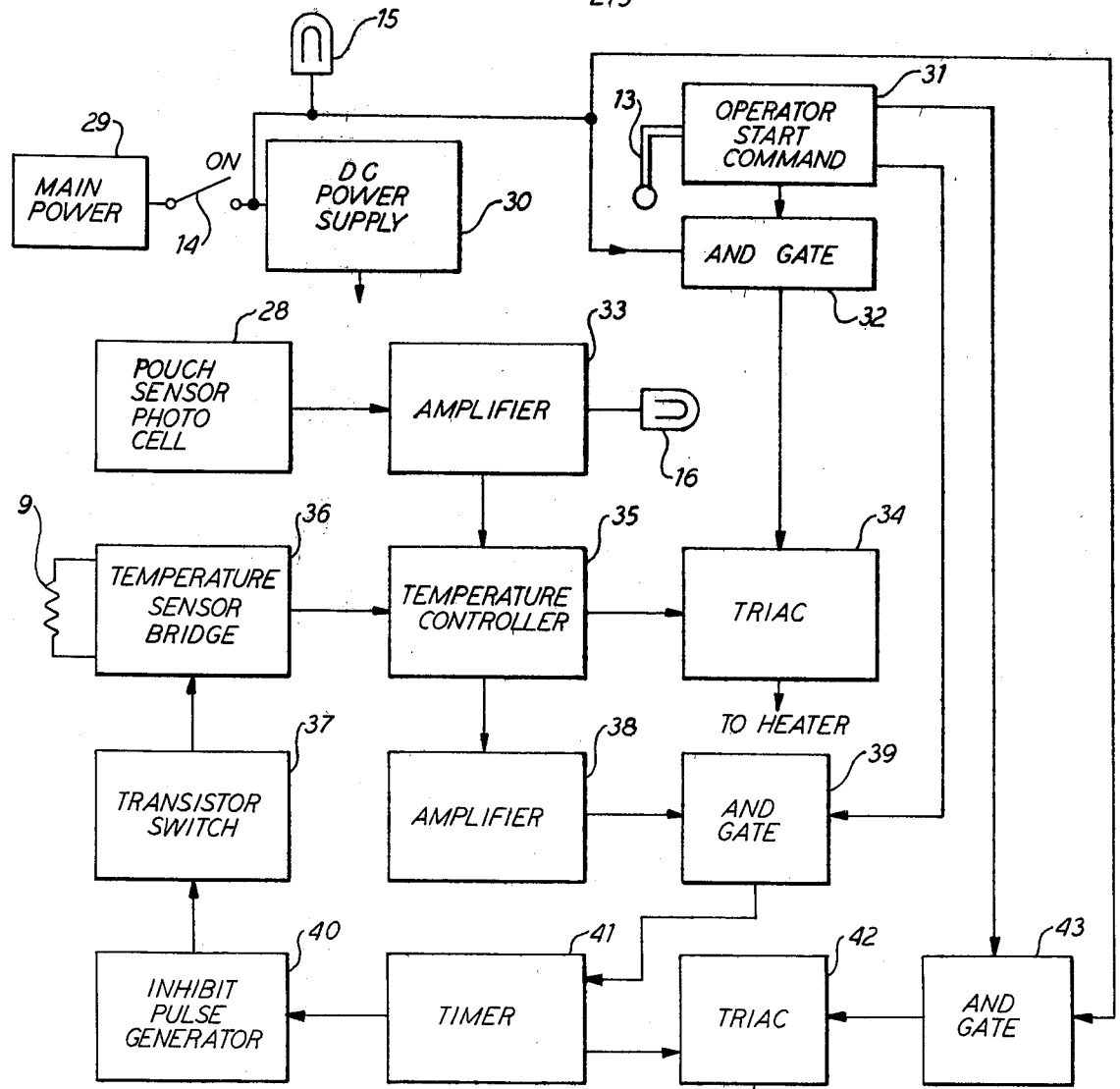
FIG. 4 is a block diagram of one embodiment of electronic circuitry employed for performing the functions illustrated in the graph of FIG. 3.

FIG. 4 is one preferred electrical circuit for performing the functions described in FIG. 3 The on/off switch 14 supplies mains power 29 to a DC power supply 30 which supplies DC power for operating the various electronic circuits. AC power is also fed to AND gate 43 and also AND gate 32. The operator start command 31 which comprises a multiple switch controlled by the lever arm 13 also provides an enabling signal to AND gate 43, AND gate 39, and AND gate 32.

AND gate 32 when enabled supplies the AC power to the triac 34 which controls the heaters. The triac is also cycled by the temperature controller 35 preferably constructed as an integrated circuit RCA type 3059. This integrated circuit receives an input from amplifier 33 connected to the pouch sensor photo-cell 28. Ready light 16 also connects to amplifier 33.

The temperature controller integrated circuit 35 further receives an input from a resistance type temperature sensor bridge 36. This bridge circuit has one leg which can be selectively shunted by a transistor switch 37 when so directed by the inhibited pulse generator 40 which generates switching pulses for the transistor switch 37. A timer 41 preferably formed of an integrated circuit RCA type 555 controls the inhibit pulse generator for creating the switching pulses for the transistor switch 37. Timer 41 receives enabling signals from the AND gate 39 which in turn is enabled by signals from the temperature controller 35 through amplifier 38 and also from the operator start command 31. The timer 41 controls the triac 42 which further receives AC power through the AND gate 43. Triac 42 controls the motor 27.

The circuit determines the lower and upper "set temperatures" (also termed the first and second temperatures) in the following manner. Upon receiving an operator start command and pouch signal from amplifier 33, the temperature controller 35 triggers the triac 34 on. The triac 34 remains on until the selected heater temperature is reached. At this point, the bridge temperature sensor 36 which monitors the heater temperature initiates a signal to the temperature controller 35 turning the triac 34 off. This action of triac on and off maintains the heater temperature to a value in accordance with signals from the temperature sensor bridge. The temperature sensor bridge can be out of balance low, out of balance high, or in balance. In two of these conditions power to the heater is off. In the third condition power to the heater is on until the bridge changes as a result of increased heater temperature, to one of the other two conditions at which time heater power is switched off. The point at which power to the heater is turned off initiates a timer turning the motor triac to on and applying power to the motor. Power to the motor remains on until the timer times out.

The value of the temperature sensor bridge which determines at what point the motor is turned on is a function of not only the bridge sensor but also of the bridge shunt. The bridge shunt alters the bridge balance on the initial machine turn on so as to turn the motor on at a lower heater temperature (first temperature). This point is referred to as the lower set temperature. When the bridge shunt is inhibited, the temperature sensor bridge is set to the upper set temperature.

It will be appreciated by those skilled in the art that other electronic circuitry may be employed for performing the novel functions of FIG. 3.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. A method for laminating a packet formed of an article to be laminated positioned between top and bottom leaves having a heat reactivatible adhesive layer thereon, comprising the steps of:
   providing a laminating machine having a heating zone with an electrical heating member;
   providing means for pulling the packet through the heating zone and compressing the packet;
   placing a lead edge of the packet in a ready position in the heating zone prior to applying electrical power to the heating member;
   applying electrical power to the heating member without initiating movement of the packet through the heating zone;
   when the heating zone attains a first temperature initiating movement of the packet through the heating zone;
   while the packet is moving through the heating zone when a second temperature higher than the first and suitable for continuous laminating occurs controlling the power to the heating member so as to maintain the heating zone at the second temperature; and
   after a trailing edge of the packet has approximately cleared the heating zone disconnecting power to the heating member to permit cooling thereof after completion of the laminating.

2. The method of claim 1 wherein when the first temperature is attained, power to the heating member is temporarily interrupted as the packet begins moving through the heating zone so as to reduce temperature overshoot.

3. The method of claim 2 wherein after the temporary interruption of power, power is continuously applied to the heating member until said second temperature is attained at which time power is cycled on and off during the laminating to maintain the second temperature substantially constant.

4. The method of claim 1 wherein, to maintain the second temperature substantially constant, power to the heating member is cycled on and off during the laminating.

5. The method of claim 1 wherein power to the heating member is discontinued when the trailing edge of the packet clears the heating zone but power is continued to be supplied to a drive mechanism for moving the packet for a predetermined time interval.

6. A method for laminating a packet formed of an article to be laminated positioned between top and bottom leaves having a heat reactivatible adhesive layer thereon and a tab releasably connected at one end of the packet, comprising the steps of:
   providing a laminating machine having upper and lower heating elements and upper and lower drive rollers forming a packet engaging nip rearwardly of the heating elements;
   placing a lead edge of the packet in a ready position such that the tab on the packet can be engaged in the nip;
   applying electrical power to the heating elements while the packet is stationary;
   when a first temperature is attained in a heating zone at the heating elements, initiating movement of the packet by energizing a motor to drive the drive rollers;
   while the packet is moving through the heating zone continuing to appy power to the heating elements until a second temperature substantially higher than the first suitable for continuously laminating the moving packet is attained; and
   when laminating of the packet is completed, disconnecting power to the heating elements but continuing drive of the drive rollers until the laminating packet has cleared the machine and thereafter disconnecting power to the drive motor.

7. The method of claim 6 wherein power to the heating elements is temporarily disconnected when the first temperature is attained so as to prevent a temperature overshoot.

8. A system for laminating a packet formed of an article to be laminated positioned between top and bottom leaves having a heat reactivatible adhesive layer thereon, comprising:
   a laminating machine having a heating zone with an electrical heating member, said laminating machine also having means for pulling the packet through the heating zone and means for compressing the packet for laminating;
   means for aligning the packet in a ready position prior to applying electrical power to the heating member;
   means for applying electrical power to the heating member when the packet is in the ready position without initiating movement of the packet through the heating zone;
   means for activating the means for pulling to initiate movement of the packet through the heating zone when the heating zone attains a first temperature;
   means for controlling power to the heating member while the packet is moving through the heating zone so as to maintain the heating zone at a second temperature substantially higher than the first suitable for continuous laminating; and
   means for disconnecting power to the heating member when laminating of the packet has been completed.

9. The system of claim 8 wherein means are provided for maintaining the second temperature by cycling power in an ON and OFF manner to the heating member during laminating.

10. The system of claim 8 wherein means are provided for temporarily disconnecting power to the heating member when the first temperature is attained so as to prevent temperature overshoot.

* * * * *